Jan. 5, 1943.  C. V. SEAWRIGHT  2,307,336
VALVE FOR FLUID COMPRESSORS
Filed Feb. 18, 1942  2 Sheets-Sheet 1

Inventor:
CLYDE VERNON SEAWRIGHT
By
Eaton & Brown
Attorneys

Jan. 5, 1943.   C. V. SEAWRIGHT   2,307,336
VALVE FOR FLUID COMPRESSORS
Filed Feb. 18, 1942   2 Sheets-Sheet 2
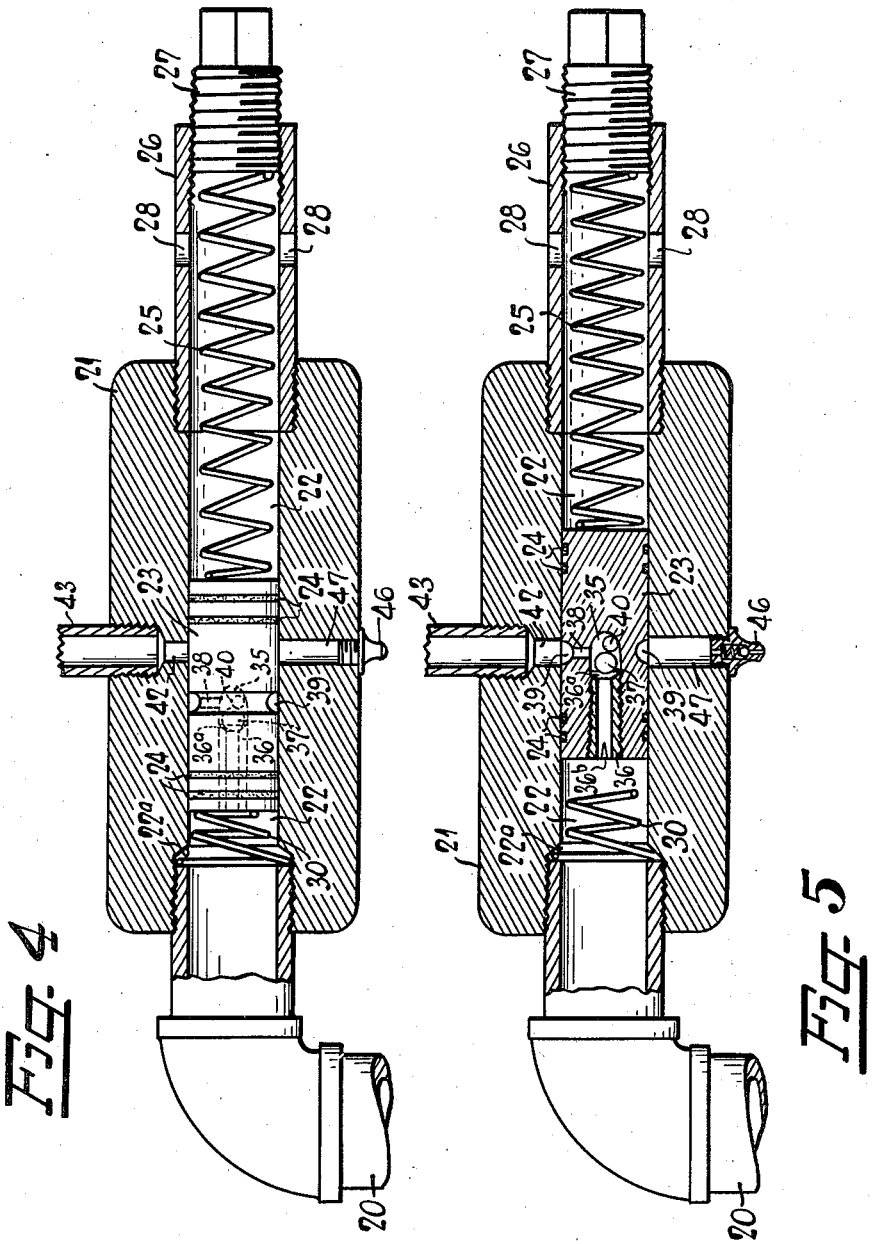
Inventor:
CLYDE VERNON SEAWRIGHT
By
Eaton + Brown
Attorneys Patented Jan. 5, 1943

2,307,336

UNITED STATES PATENT OFFICE 2,307,336

VALVE FOR FLUID COMPRESSORS

Clyde Vernon Seawright, Coolidge, Ga., assignor of one-fourth to Luther Smith, and one-fourth to Roy B. Hicks, both of Coolidge, Ga.

Application February 18, 1942, Serial No. 431,355

1 Claim. (Cl. 277—44)

This invention relates to valves and more especially to an improved check valve adapted for use where one fluid under a given pressure is being introduced upon another fluid under a lesser pressure. Check valves of this type are used in conjunction with many instrumentalities and mechanisms such as compressors and storage tanks for supplying compressed air to automobile tires, and air brakes, compressors for refrigerators and other liquid storage systems. In many of these systems, pressure is transferred through a series of pulsations from a source such as a pump or compressor to a point of dispensation or storage such as a tire or tank. If at any time during the transfer, the pressure at the source falls below the pressure at the point of storage or dispensation, there wil be a reversal of the flow unless a suitable check valve is employed.

For example, in a system where a compressor is compressing and forcing air into a storage tank, with a check valve disposed in the line between the compressor and the storage tank, the entire back pressure in the tank must be worked against on each compression stroke where a conventional check valve is disposed in the line. By placing a valve of the type herein shown and described in this line between the compressor and the storage tank, this pressure in the storage tank does not exert itself upon the compression stroke until the limit of the compression stroke has been reached, at which time the sliding valve has been forced to a point whereby the compressed air is transferred quickly into the storage tank. In this way the work performed in overcoming the back pressure in the storage tank is eliminated to a very great degree, if not entirely. Thus it takes a very much less expenditure of power to force the air into the tank. By arranging a sliding valve with a check valve therein which is adapted to normally close communication between the compressor and the storage tank, the pressure from the storage tank is exerting itself against the side of the sliding valve and thus offers very little resistance to the travel of the sliding valve. When the sliding valve under the force of the compression stroke has reached a point to establish communication between the compressor and the storage tank, the compressed air built up in the line between the compressor and the sliding valve is allowed to quickly escape under the height of the compression stroke in the storage tank.

It is an object of this invention to provide an improved check valve for fluid compressing and storage systems which will permit transfer of pressure with a maximum amount of efficiency and also prevent the reverse flow in the transfer line when the pressure in the source falls below the pressure beyond the check valve.

It is another object of this invention to provide a check valve having a passageway, said passageway having a double acting cut-off therein for preventing the reversal of flow when the pressure at source falls below the pressure at the point beyond the check valve.

It is still another object of this invention to provide an improved check valve of the reciprocating piston type wherein the initial pressure exerted upon the compression stroke will be employed to move the piston to transfer position to thereby allow the compression stroke to be practically completed at the time the transfer is made.

The specific valve structure comprises, in part, a casing having an inlet bore therein in which a piston is mounted for reciprocation, said piston being normally forced toward the bore inlet by a suitable spring. An angularly disposed outlet bore leads from the inlet bore, and this outlet bore is normally closed by the piston periphery when the pressure at the inlet is less than the pressure at the outlet of the bore. The piston is provided with a passageway, one end of which normally communicates with the bore inlet and its other end is normally closed by the sidewalls of the casing. When pressure is introduced into the inlet bore under a compression stroke, the piston slides longitudinally of the bore to cause the normally closed end of the passageway to register with said outlet bore. A spring can be adjusted whereby a relatively small amount of pressure in the inlet bore will cause the passageway and outlet bore to register or coincide, but in order for the fluid to be transferred the pressure in the inlet bore must be in excess of the pressure beyond the check valve. Therefore, it is necessary to provide an additional check valve in the passageway to prevent reversal of the flow when the pressure in the inlet bore becomes less than the pressure beyond the valve while the passageway registers with the outlet bore.

Some of the objects of the invention having been stated, other objects will appear as the description proceeds when taken in connection with the accompanying drawings, in which—

Figure 4 is a longitudinal sectional view through the valve structure showing the piston in a retracted position;

Figure 5 is a longitudinal sectional view through the valve structure similar to Figure 4, but showing the piston extended to a position where fluid or air may be transferred through the valve.

Figure 1:
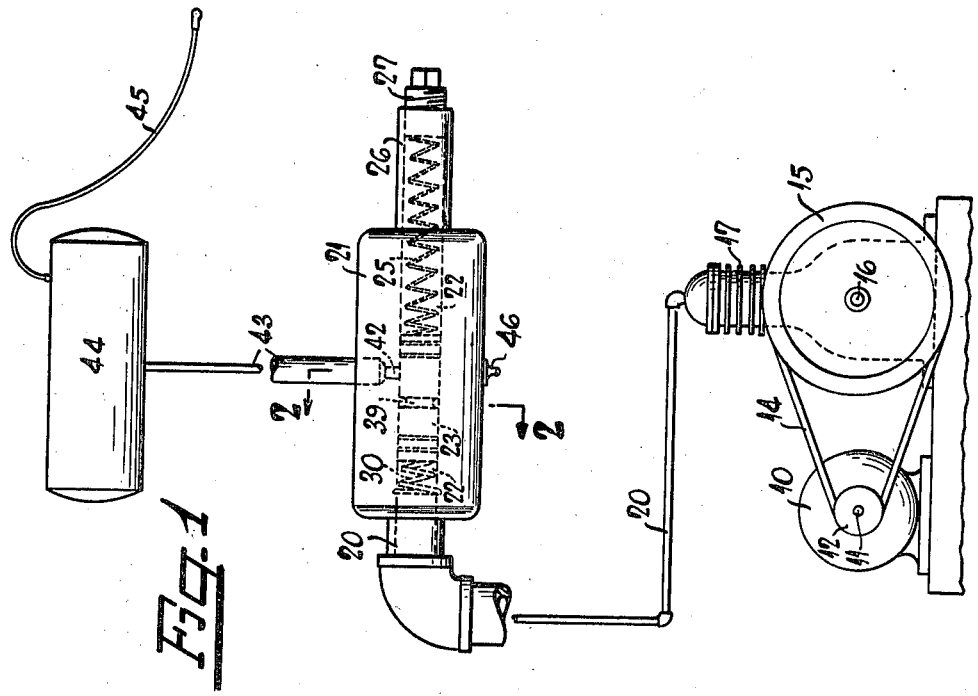
Figure 1 is an elevation of my improved valve shown in conjunction with a compressor and tank with my valve being shown on a greatly enlarged scale.
Figure 2:
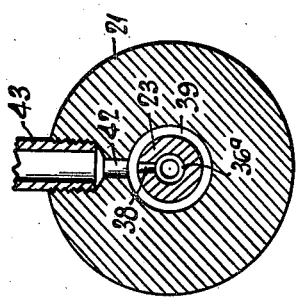
Figure 2 is an enlarged vertical sectional view through the valve structure taken along the line 2—2 in Figure 1.
Figure 3:
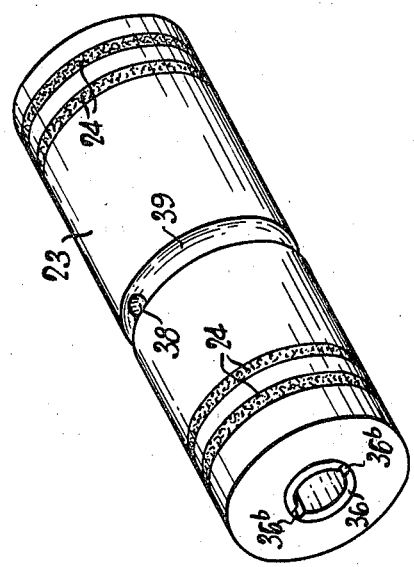
Figure 3 is an isometric view of the reciprocating piston adapted to work in conjunction with the valve structure.

Referring more particularly to the drawings, the numeral 10 designates a suitable motor having a shaft 11 upon which a pulley 12 is mounted. A belt 14 is mounted on a pulley 12 and also upon a larger pulley 15 on a compressor shaft 16. This compressor shaft 16 extends from a compressor 17 and serves to operate the same in a conventional manner.

Leading from the compressor 17 is a conduit or pipe 20, the other end of which leads into one end of a valve casing 21. An intake bore 22 within this valve casing communicates with the end of pipe 20. Slidably mounted within the bore 22 is a piston 23, said piston having a plurality of rings 24 near each end thereof so as to prevent pressure from leaking between the sidewalls of the bore and the exterior periphery of the piston. It will be seen by referring to Figure 4 that the piston 23 is normally urged to the left, namely, toward the inlet end of bore 22, by means of a suitable spring 25 which spring is also mounted in the bore 22. The right-hand end of spring 25 is housed within a pipe 26, threadably secured in the right-hand end of bore 22. In order to confine the spring 25 in position to cause it to normally urge the piston 23 to the left (Figure 4), a suitable nut 27 is threadably secured in the right hand end of pipe 26. This spring is sufficiently strong to normally urge the piston 23 to the position shown in Figure 4 when no pressure is applied to the inlet of bore 22. The nut 27, however, may be manipulated to increase or to decrease the resistance offered by the spring 25 to the movement of piston 23 when it is desired to so do. It is probable that when an extremely high pressure is present in pipe 43, it is necessary to substantially increase the resistance offered by spring 25 in order to stabilize the piston 23 and prevent the same from vibrating unnecessarily.

In order to permit the piston 23 to move freely in bore 22 while under pressure so as to prevent a back pressure from being offered by the air within the pipe 26, suitable holes 28 are provided in this pipe thereby allowing the air to pass in and out of the pipe when the piston 22 reciprocates.

As a means for counteracting the force of the spring 25 when the piston 23 moves to the left in Figures 4 and 5 another spring 30 is provided in the left-hand end of bore 22. This spring 30 has one end thereof secured between the end of pipe 20 and a suitable shoulder 22a, which shoulder is formed by making the bore which receives pipe 20 of a slightly larger diameter than the bore 22 which receives the piston 23. The right hand end of spring 30 extends inwardly into the bore and serves as a shock absorber for the piston as it returns to the left, that is to the position shown in Figure 4, after a compression stroke has been delivered by the compressor 17.

The piston 23 has an axially disposed bore 35 therein, in which is threadably mounted a sleeve 36. This sleeve has suitable notches 36b cut in the left-hand end thereof (Figures 4 and 5) in which a suitable tool such as a screw driver or wedge may be inserted for turning the sleeve 36 to the proper position within the bore 35. It will be noted by observing Figure 5 that the right-hand end of sleeve 36 has a tapered valve seat 36a which is adapted to accommodate, at times, a suitable ball 37 said ball 37 being disposed in bore 35. Leading from the bore 35 and at substantially right angles thereto is a second bore 38 which extends radially from the bore 35 and has its outer end communicating with a peripheral groove 39 in the piston. The ball 37 is prevented from moving over the opening 38 by a second ball 40 in the bore 35, this second ball being of a smaller diameter than the ball 37, but is slightly larger than the diameter of bore 38.

When a compression stroke is being exerted by the compressor 17, pressure is introduced into the left-hand end of bore 22 which, in turn, causes the ball 37 to move off seat 36a to thereby permit air to enter the right-hand end of bore 35 and pass inwardly through radially disposed bore 38 into peripheral groove 39. It is only when the pressure exerted upon piston 34 is sufficient to move this piston from the position shown in Figure 5 that any air is permitted to leave the peripheral groove. Of course, after the pressure exerted by the compressor has moved the piston 23 to the position shown in Figure 5, the pressure within the bore 35 will pass from this bore into the bore 38, peripheral groove 39, passageway 42 and then into outlet pipe 43. This outlet pipe leads to any suitable apparatus such as a storage tank 44 from which it is dispensed for various uses, such as inflating automobile tires and the like. When this tank is employed for inflating tires, a suitable hose line 45 is usually provided.

When the compression stroke exerts a pressure at the intake of bore 22 in excess of the back pressure exerted by tank 44, the ball 37 being unseated from the valve seat 36a, the piston upon each compression stroke will first move from the position shown in Figure 4 to the position shown in Figure 5, at which time the peripheral groove 39 will register with the bore 42 to permit air to pass from the compressor to the tank 44. When the compression stroke has been delivered then the spring 25 will return the piston from the position shown in Figure 5 to the position shown in Figure 4. In other words, the piston 23 will reciprocate back and forth along with the movement of the compressor.

By employing an improved valve of this type, a substantial portion of the compression stroke of the compressor can be completed before the peripheral groove 39 will have registered with the outlet opening 42 in the casing to permit the air to be transferred into tank 44.

Furthermore, a double check valve is provided to prevent the air in the tank 44 from returning to the compressor. These double checks comprise the ball 37 which seats on valve seat 36a and also the periphery of the piston 23 which closes port 42 at all times, except when a compression stroke is being delivered.

If desired, a suitable lubrication fitting 46 may be threadably secured in a bore 47 in casing 21, so that the interior of the cylinder or bore 22 may be lubricated to prevent escape of pressure around the piston 23. The fitting 46 may be removed and a suitable exhaust pet-cock provided for relieving pressure from the valve casing 21.

or for connecting another hose to deliver pressure direct from the compressor unit through the check valve assembly instead of from tank 44.

Let us assume that there is, at a given time, seventy-five pounds pressure per square inch in the storage tank 44 and that the compressor 17 is capable of creating a pressure of one hundred and twenty five pounds per square inch at the end of the compression stroke. Now, in the primary stages of the compression stroke, the piston 23 will be moved to a transfer position shown in Figure 5, at which time the spring 25 will be exerting its pressure to resist movement of the piston. This piston movement, in combination with the unseating of the ball 37 and the passage of air into the pipe 43 and into storage tank 44 will hold the piston 23 in transfer position until the air from the compression stroke has been delivered into the storage tank.

When the receding stroke of the compressor 17 begins it is evident that the pressure will be relieved in the left-hand end of bore 22, and the pressure from the storage tank will immediately exert pressure to cause the compressed air to start reverse flow through piston sleeve 36 which reverse flow will immediately seat ball 37 in its seat 36a. The pressure exerted in the seating operation together with the compression under which spring 25 is placed will immediately cause the piston to move to the position shown in Figure 4.

The plug 27 may be manipulated to place the spring 25 under proper initial compression so as to provide a mean point at which the peripheral groove 39 will coincide with outlet passage 42. If the system is so set as to build up a compression of one hundred pounds per square inch in tank 44 before automatically cutting off, then of course the plug 27 would be screwed into the pipe 26 farther than would be the case if the cutting off point were lower. In other words, the adjustment of the amount of resisting force offered by the spring 25 is such as to cause the peripheral groove 39 to center somewhere in the neighborhood of outlet port 42. Upon a compression stroke, the movement of piston 23 will be arrested by the leakage of the compressed air into the pipe 43 through outlet 42, which leakage will prevent the peripheral groove 39 from passing entirely beyond or to the right of the outlet port 42.

In the drawings and specification, there has been set forth a preferred embodiment of the invention, and although specific terms are employed they are used in a generic and descriptive sense only and not for purposes of limitation, the invention being defined in the claim.

I claim:

In a check valve, a cylindrical casing having a bore therein, provided with an inlet port at one end and an outlet port intermediate its ends disposed at substantially right angles to the axis of the bore, a piston slidably mounted in the bore, a threaded plug closing one end of the bore, a spring in one end of the bore normally forcing the piston towards the inlet port, a second spring in the other end of the bore, for cushioning the stroke of the piston when it travels towards the inlet port, said piston having a peripheral groove therein and also having a longitudinally disposed passageway therein extending from the end adjacent the inlet port to a point adjacent the peripheral groove, a transverse passageway in the piston connecting the longitudinal passageway and the peripheral groove, a ball in the longitudinal passageway, a sleeve in the longitudinal passageway for loosely confining the ball, a smaller ball adjacent the first ball for preventing the larger ball from closing the transverse passageway in the piston, the inlet port being adapted to have a source of fluid such as a compressor, connected thereto, whereby when pressure is admitted into the bore the piston will be moved longitudinally of the bore to cause the peripheral groove to coincide with the outlet port of the casing to permit passage of fluid out through the outlet port as the peripheral groove passes the outlet port in the casing, and when the pressure is thus expended through the outlet port the first spring will return the piston towards the inlet port of the casing.

CLYDE VERNON SEAWRIGHT.